United States Patent
McHenry et al.

(10) Patent No.: US 10,947,931 B2
(45) Date of Patent: *Mar. 16, 2021

(54) COMPRESSOR STAGE EGR INJECTION

(71) Applicant: BorgWarner Inc., Auburn Hills, MI (US)

(72) Inventors: Joseph Powell McHenry, Arden, NC (US); Gordon Clark Jenks, Hendersonville, NC (US); Robert Malcolm Wallace, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,583

(22) Filed: Oct. 12, 2018

(65) Prior Publication Data

US 2019/0107082 A1  Apr. 11, 2019

Related U.S. Application Data

(63) Continuation of application No. 15/197,921, filed on Jun. 30, 2016, now Pat. No. 10,100,785.

(51) Int. Cl.
*F02M 26/05* (2016.01)
*F02M 26/09* (2016.01)
(Continued)

(52) U.S. Cl.
CPC .............. *F02M 26/05* (2016.02); *F02B 33/40* (2013.01); *F02B 37/00* (2013.01); *F02B 37/005* (2013.01);
(Continued)

(58) Field of Classification Search
CPC ........ F02M 26/05; F02M 26/09; F02M 26/19; F02M 26/22; F02M 26/34; F02M 26/51;
(Continued)

(56) References Cited

U.S. PATENT DOCUMENTS

| 4,250,711 A | 2/1981 | Zehnder |
| 5,327,725 A | 7/1994 | Mitsubori |

(Continued)

FOREIGN PATENT DOCUMENTS

| DE | 102016102185 A1 | 9/2016 |
| GB | 2504096 A | 1/2014 |

(Continued)

OTHER PUBLICATIONS

International Search Report and Written Opinion; dated Aug. 9, 2017; for International Application No. PCT/US2017/039671; 13 pages.

*Primary Examiner* — Thai Ba Trieu
(74) *Attorney, Agent, or Firm* — Young Basile Hanlon & MacFarlane, P.C.

(57) ABSTRACT

A product may include a bearing housing in which a shaft may be supported by a bearing so that it may rotate. A compressor wheel may be disposed on the shaft. A compressor cover may be connected with the bearing housing, which may form a compressor body and may define a chamber within which the compressor wheel may rotate. A diffuser may extend radially outward from the chamber and may receive gas from the compressor wheel. An inlet may be provided to the compressor body, which may receive a supply of exhaust gas. An EGR distribution cavity may be defined within the compressor body and may extend around the shaft. An EGR inlet channel may extend into the bearing housing from the inlet to the EGR distribution cavity. An EGR passage may extend from the EGR distribution cavity to the diffuser.

18 Claims, 6 Drawing Sheets

(51) Int. Cl.

| | |
|---|---|
| *F02M 26/19* | (2016.01) |
| *F02M 26/22* | (2016.01) |
| *F02M 26/34* | (2016.01) |
| *F02M 26/51* | (2016.01) |
| *F02B 33/40* | (2006.01) |
| *F02B 37/00* | (2006.01) |
| *F02C 3/13* | (2006.01) |
| *F02C 3/34* | (2006.01) |
| *F02C 6/12* | (2006.01) |
| *F04D 17/10* | (2006.01) |
| *F04D 29/05* | (2006.01) |
| *F04D 29/28* | (2006.01) |
| *F04D 29/44* | (2006.01) |
| *F04D 29/053* | (2006.01) |
| *F04D 29/056* | (2006.01) |

(52) U.S. Cl.
CPC ................ *F02C 3/13* (2013.01); *F02C 3/34* (2013.01); *F02C 6/12* (2013.01); *F02M 26/09* (2016.02); *F02M 26/19* (2016.02); *F02M 26/22* (2016.02); *F02M 26/34* (2016.02); *F02M 26/51* (2016.02); *F04D 17/10* (2013.01); *F04D 29/053* (2013.01); *F04D 29/056* (2013.01); *F04D 29/284* (2013.01); *F04D 29/441* (2013.01); *F05D 2220/40* (2013.01); *Y02T 10/12* (2013.01)

(58) Field of Classification Search
CPC ...... F02B 334/40; F02B 37/00; F02B 37/005; F02C 3/13; F02C 3/34; F02C 6/12; F04D 17/10; F04D 29/053; F04D 29/056; F04D 29/284; F04D 29/441; F05D 2220/40; Y02T 10/144

USPC .......................................... 60/605.2; 701/108
See application file for complete search history.

(56) References Cited

U.S. PATENT DOCUMENTS

| | | | |
|---|---|---|---|
| 5,406,796 | A | 4/1995 | Hiereth et al. |
| 6,050,095 | A | 4/2000 | Blake |
| 6,145,313 | A | 11/2000 | Arnold |
| 7,624,575 | B2 | 12/2009 | Noelle et al. |
| 8,820,071 | B2 | 9/2014 | Tkac |
| 9,091,275 | B2 | 7/2015 | Chen |
| 9,133,793 | B2 | 9/2015 | Wu |
| 9,303,650 | B2 | 4/2016 | Ulrey et al. |
| 10,100,785 | B2 * | 10/2018 | McHenry ............... F02M 26/05 |
| 2008/0000230 | A1 | 1/2008 | Strauser |
| 2012/0312011 | A1 | 12/2012 | Romblom |
| 2016/0097351 | A1 | 4/2016 | Kiener et al. |

FOREIGN PATENT DOCUMENTS

| | | | | |
|---|---|---|---|---|
| JP | H0571427 | A | 3/1993 | |
| JP | 06147027 | A * | 5/1994 | ............ F02M 26/07 |
| JP | H08109856 | A | 4/1996 | |
| JP | 2012140876 | A | 7/2012 | |
| JP | 2012149588 | A | 8/2012 | |
| JP | 2012229677 | A | 11/2012 | |
| JP | 2014214700 | A | 11/2014 | |
| JP | 2015081543 | A | 4/2015 | |

* cited by examiner

COMPRESSOR STAGE EGR INJECTION

This application is a continuation of U.S. application Ser. No. 15/197,921 filed Jun. 30, 2016 which is a U.S. national phase application filed under 35 U.S.C. § 371 of International Application PCT/US2017/039671 filed on Jun. 28, 2017, designating the United States.

TECHNICAL FIELD

The field to which the disclosure generally relates includes turbocharger systems for internal combustion engines, and more particularly, includes exhaust gas driven turbocharger systems.

BACKGROUND

Engine intake systems may typically include a charging system where exhaust gas generated by the combustion of fuel passes through a turbine which drives a compressor. Engine intake air may be mixed with recirculated exhaust gases and the mixed gas may be directed to the compressor which charges the intake system of the engine.

SUMMARY OF ILLUSTRATIVE VARIATIONS

A number of illustrative variations may involve a product that may include a bearing housing in which a shaft may be supported by a bearing so that it may rotate. A compressor wheel may be disposed on the shaft. A compressor cover may be connected with the bearing housing, which may create a compressor body, and may define a chamber within which the compressor wheel may rotate. A diffuser may extend radially outward from the chamber and may receive gas from the compressor wheel. An inlet may be provided to the compressor body, which may receive a supply of exhaust gas. An EGR distribution cavity may be defined within the compressor body and may extend around the shaft. An EGR inlet channel may extend into the bearing housing from the inlet to the EGR distribution cavity. An EGR passage may extend from the EGR distribution cavity to the diffuser.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
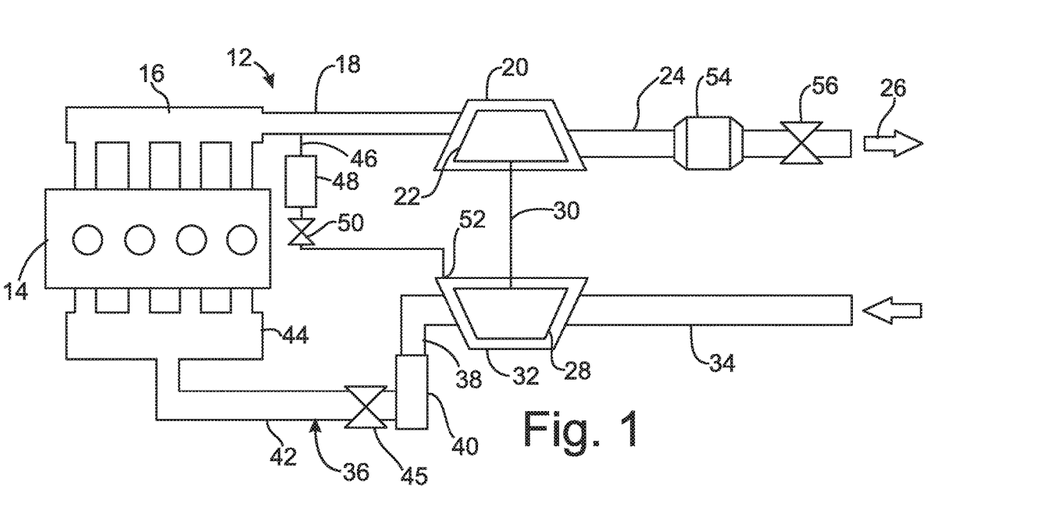
FIG. 1 is a schematic illustration of an engine breathing system according to a number of variations.

In a number of illustrative variations as shown in FIG. 1, an engine breathing system 12, may include an internal combustion engine 14 that may have a number of cylinders for the controlled combustion of fuel to produce power. Exhaust gas generated during combustion may exit the engine 14 at an exhaust manifold 16 that may be connected to an exhaust passage 18. The exhaust passage 18 may lead to a turbine 20. The exhaust gas may be expanded in the turbine 20 which may release energy to rotate a turbine wheel 22. The exhaust gas may continue from the turbine 20 through an exhaust passage 24 to an exhaust discharge 26.

In a number of variations the turbine wheel 22 may be connected to a compressor wheel 28, such as by a shaft 30. The compressor wheel 28 may be disposed in a compressor 32. Through the action of routing exhaust gases to the turbine wheel 22, the compressor wheel 28 may be rotated through the shaft 30. The rotating compressor wheel 28 may draw air in through an intake passage 34, which it compresses. This charges the intake system 36 of the engine 14 through a passage 38, charge air cooler 40, a passage 42 and intake manifold 44. An intake throttle valve 45 may be provided to selectively throttle the passage 42 when desired, and according to a number of variations may be omitted.

In a number of variations the compressor 32 may draw exhaust gas through an exhaust gas recirculation (EGR) loop. The EGR loop may include an EGR passage 46, which may lead to a heat exchanger 48 and may extend through a valve 50 for regulating the flow of exhaust gas through the EGR loop. The EGR passage 46 may pass through the heat exchanger 48 and valve 50 and then may lead directly to the compressor 32 at an inlet 52. The EGR passage 46 may be connected to the exhaust system at any of a number of locations, including but not limited to at the exhaust passage 18 or the exhaust manifold 16. When connected upstream of the turbine 20, turbine sizing may be selected to provide a desired pressure for feeding the EGR passage 46. A waste gate duct (not shown), with a valve may provide a bypass around the turbine wheel 22. Exhaust gas leaving the system may proceed through an after treatment device 54 and an exhaust throttle valve 56. The exhaust throttle valve 56 may selectively throttle flow when needed such as to increase the flow of exhaust gas through the EGR loop. In a number of variations, the pressure created for feeding the EGR passage 46 by the sizing of the turbine 20, may enable eliminating the exhaust throttle valve.

The supply of exhaust gas recirculation may be provided to abate the formation of unwanted compounds during the combustion process in internal combustion engine 14. A pressure differential is required to drive the exhaust gas flow from the exhaust passage 24 to the intake system. This pressure requirement could result could result in lower efficiency and higher brake specific fuel consumption, such as if the exhaust throttle valve 56 is cycled closed to throttle the exhaust gas flow. For example, the pressure differential between the intake manifold 44 and the exhaust manifold 16, when higher, requires more work from the engine. In a number of variations the flow field within the compressor 32 stage may be used to reduce the required pressure in the exhaust manifold 16 and exhaust passage 18 and therefore, increases overall powertrain efficiency. This is because the pressure increase from the intake manifold 44 to the exhaust manifold 16 is lower. This may be accomplished by injecting the EGR stream where the intake system has a low static pressure, so that the static pressure requirement for feeding the EGR passage 46 from the exhaust system is reduced. At a system level the reduction in exhaust pressure can lead to a more advantageous pressure delta across the cylinder head of the engine 14 and thus lower emissions and provide better fuel economy. While the pressure may be lowest at the inlet to the compressor wheel 28 it has been found that injecting exhaust gas in this area requires additional work from the compressor 32 to recompress the gas. The lowest pressure zone after the inlet has been found to reside at the compressor wheel exit where the flow velocity is highest. The difference between the static pressure at the compressor wheel 28 outlet as compared to that at the exhaust pressure at the inlet 52 can exceed 150 kPa as measured on a gas stand, and depending on rotational speed. By feeding the EGR into the high velocity area of the compressor 32, the pressure differential available to drive the EGR is significantly increased, therefore reducing or eliminating a need to throttle (cycle at least partially closed), the exhaust throttle valve 56, and/or enabling the use of a higher flowing turbine 20.

Figure 2:
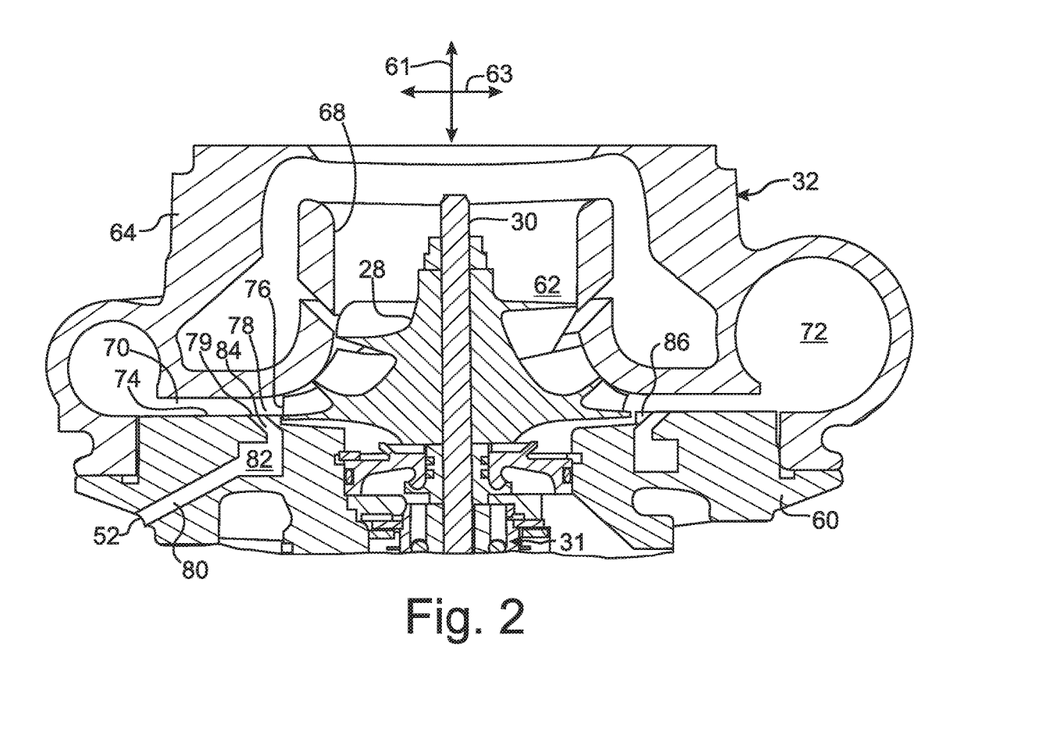
FIG. 2 is a sectioned view of a product according to a number of variations.
Figure 3:
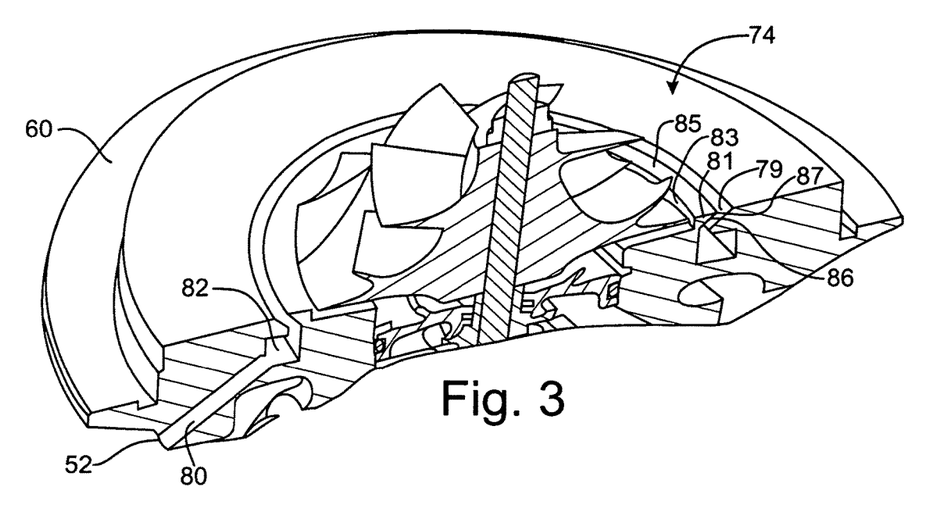
FIG. 3 is a perspective, sectioned view of a product according to a number of variations, with a compressor cover removed.

With reference to FIGS. 2 and 3, the EGR routing in a product is shown in greater detail. The description may include references to axial or axially, which is indicated by reference numeral 61 and means a direction along the axis of the shaft 30 (as indicated by reference numeral 61), or parallel thereto. The description may include references to radial or radially, which is indicated by the reference numeral 63 and means a direction toward or away from the axis of the shaft 30 in any of the 360 degrees around the shaft 30. The shaft 30 may be supported in a bearing housing 60 that may be disposed between the compressor 32 and the turbine 20. The shaft 30 may be supported by a bearing 31. The compressor wheel 28 may be disposed in a chamber 62 that may be defined by the bearing housing 60 and a compressor cover 64. An inlet 68 to the chamber 62 may be defined by the compressor cover 64 through which air may be drawn by the compressor wheel 28. Air may be delivered from the compressor wheel 28 through a diffuser 70 and may be collected in a volute 72 for communication to the passage 38. The diffuser 70 may be defined between the bearing housing 60 at a diffuser face 74, and the compressor cover 64. The diffuser 70 may form an annular passage extending radially outward from the chamber 62 at the compressor wheel tip 76 to the volute 72. Air drawn in through the inlet 68 may be acted upon in the chamber 62 by the compressor wheel 28 and delivered through the diffuser 70 to the volute 72. The flow of air leaving the compressor wheel tip 76 enters the adjacent segment of the diffuser 70 which may be referred to as a fresh air port 78. The fresh air port 78 is a segment of the diffuser 70 closest to the compressor wheel 28, which also has the highest gas flow velocity since the cross sectional area of the diffuser 70 is smaller radially inward, and becomes greater moving radially outward.

Figure 7:
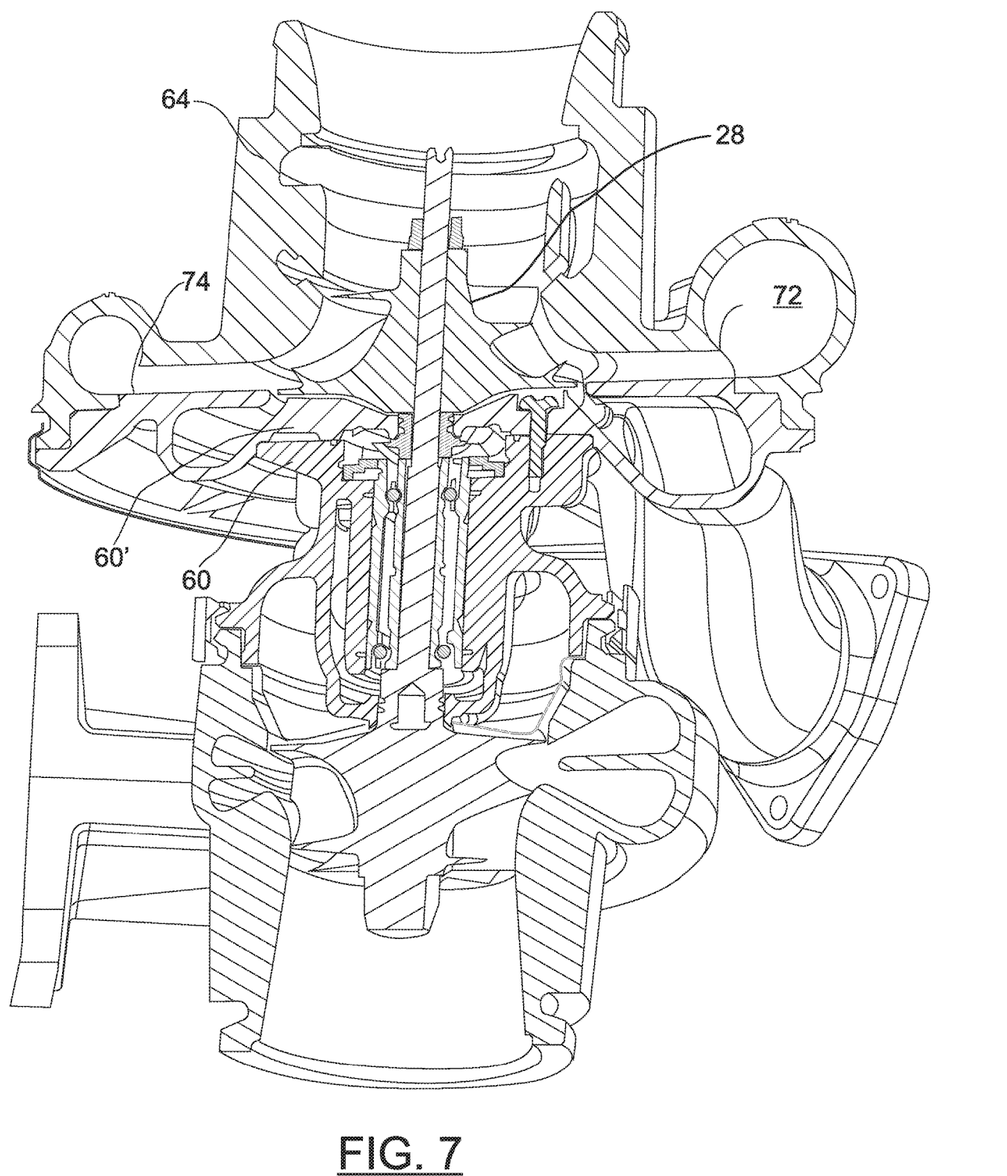
FIG. 7 is a sectioned view of a product according to a number of variations and showing a bearing housing having a separate backplate.
Figure 8:
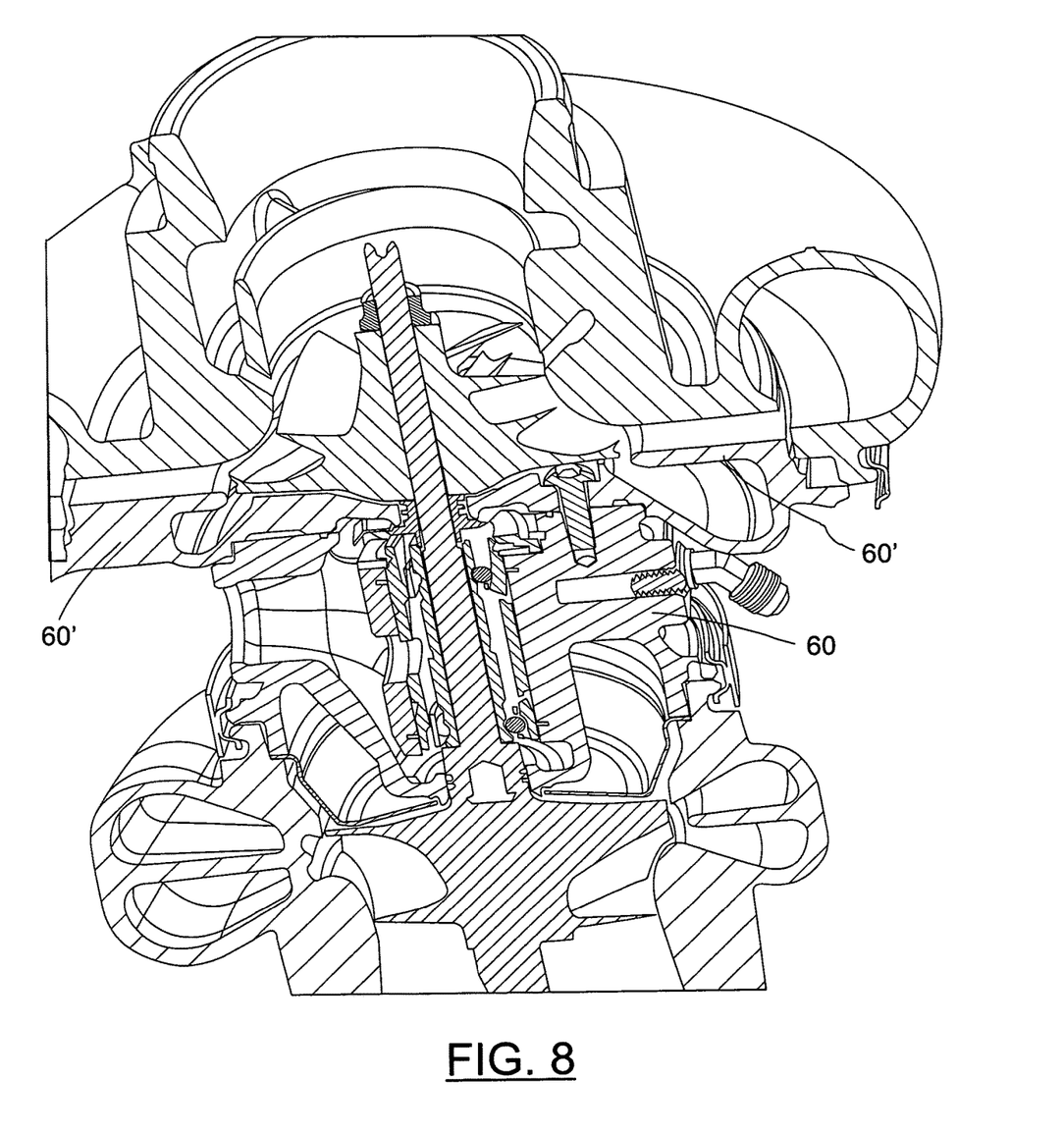
FIG. 8 is a sectioned view of a product according to a number of variations and showing a bearing housing having a separate backplate.
Figure 9:
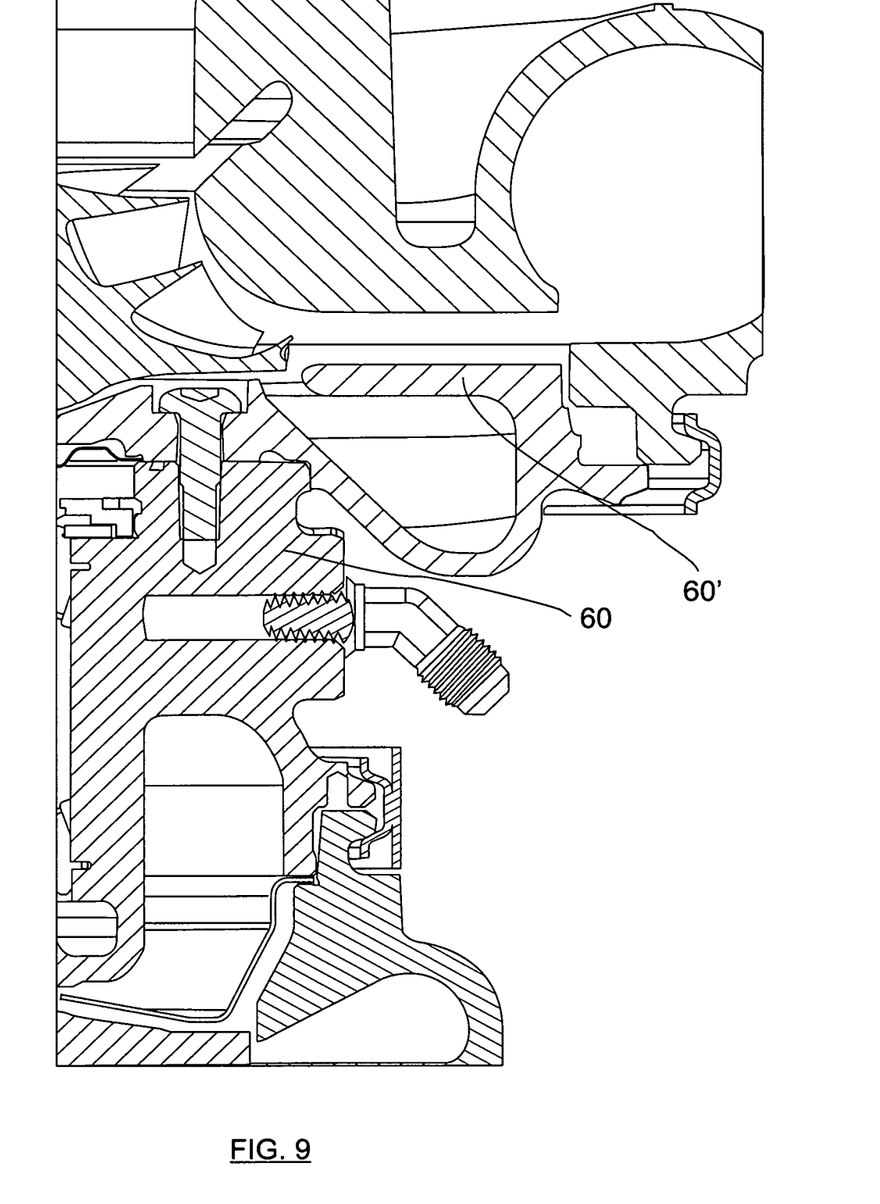
FIG. 9 is a sectioned view of a product according to a number of variations and showing a bearing housing having a separate backplate.

In a number of variations the EGR inlet 52 may be connected with an EGR inlet channel 80 that extends into the bearing housing 60 radially inward to an EGR distribution cavity 82. The EGR inlet channel 80 may be extend toward the axis 61 of the shaft 30, and may be disposed at an angle relative thereto. The EGR inlet channel 80 may be pointed directly at the axis 61. The EGR inlet channel 80 may be a single bore that may comprise the sole opening to the EGR distribution cavity 82 for the supply of EGR. The EGR inlet channel 80, including at the EGR inlet 52, may be formed at an angle relative to the axis 61 other than at perpendicular relative to the axis 61. As such, the angle of the EGR inlet channel 80 relative to the axis 61 may be oblique. This may provide ease of formation, including within existing compressor designs where available space for the EGR inlet channel 80 may be utilized. The EGR distribution cavity 82 may be defined completely within the bearing housing 60 and may extend to encircle the shaft 30. The EGR distribution cavity 82 may have a consistent size completely along its circular length around the shaft 30. In other words, the open cross section of the EGR distribution cavity 82 may have a consistent cross sectional open area at all points around its circumference. The cross section may be rectangular in shape for simplified formation, and the overall EGR distribution cavity 82 may have an annular shape each contributing to an easily formed cavity. An EGR passage 84 may connect the EGR distribution cavity 82 with the fresh air port 78 and may open through the diffuser face 74 at an opening 79. The opening 79 may be spaced from the compressor wheel tip 76 so that an annular ramp 86 may be defined by the bearing housing 60 around the compressor wheel tip 76. The EGR passage 84 may be angled radially outward so that EGR gas flowing there through is directed radially outward similar to the air flowing through the fresh air port 78. The low pressure at this high velocity segment of the diffuser 70 advantageously reduces the pressure level needed at the exhaust passage 24 to feed EGR gas into the intake manifold 44. The annular ramp 86 may be defined on a projection 81 from the bearing housing 60 that may include an axially extending wall 83 adjacent the diffuser face 74, that extends to a location disposed directly radially outside a part of the compressor wheel tip 76, and which defines the radial inner end of the diffuser face 74. A portion 85 of the diffuser face 74 extends radially outward from an edge of the axially extending wall 83 to the opening 79. From the radially outer-most edge of the portion 85, the annular ramp 86 extends back at an angle toward the shaft 30 so that the projection 81 forms the shape of a foot with a toe 87 pointed radially outward away from the shaft 30. Referring to FIGS. 7-9, in a number of variations the EGR distribution cavity 82 may be formed in a separate backplate 60' component that may define the diffuser face 74 and that may be connected to the remainder of the bearing housing 60 and may form a part of the bearing housing 60. As such, references to the bearing housing 60 may include a bearing housing 60 with a separate backplate 60'. The compressor 32 may include a compressor body 61 that may include the compressor cover 64 and the bearing housing 60 and/or the separate backplate 60' thereof.

Figure 4:
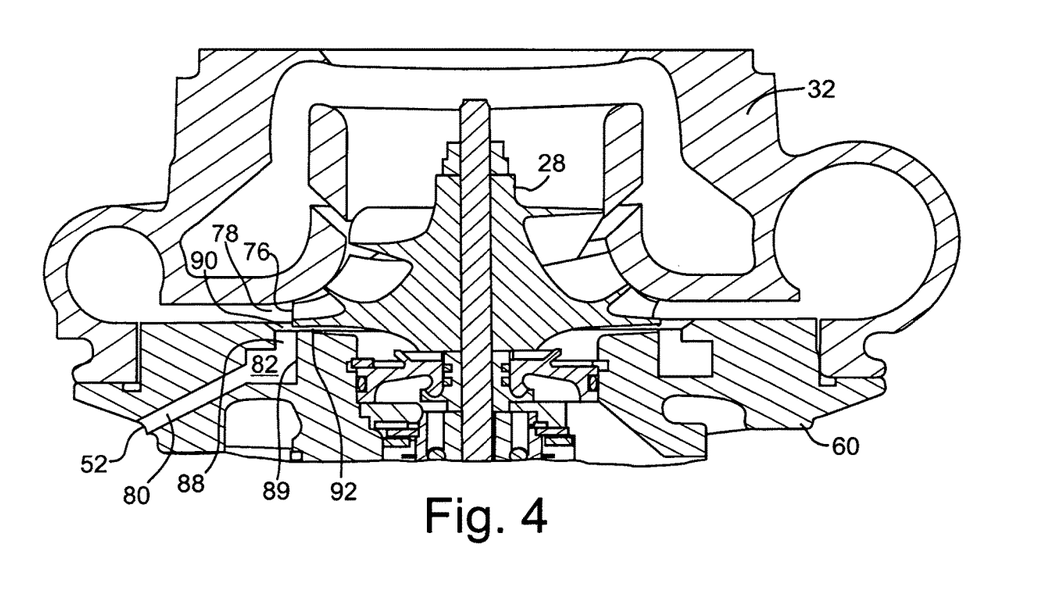
FIG. 4 is a sectioned view of a product according to a number of variations.

In a number of variations as illustrated in FIG. 4, the part of the bearing housing 60 forming the annular ramp 86 (projection 81), may be omitted. The EGR inlet channel 80 may extend through the bearing housing 60 to the EGR distribution cavity 82. The EGR distribution cavity 82 may connect with an EGR passage 88 that includes an opening 90 to the fresh air port 78 and to the back side 92 of the compressor wheel 28 adjacent the compressor wheel tip 76. A radially inner-most wall 89 on the bearing housing 60 that defines the EGR distribution cavity 82, may extend axially, and may be directed at the back side 92 of the compressor wheel 28 radially inside the compressor wheel tip 76.

Figure 5:
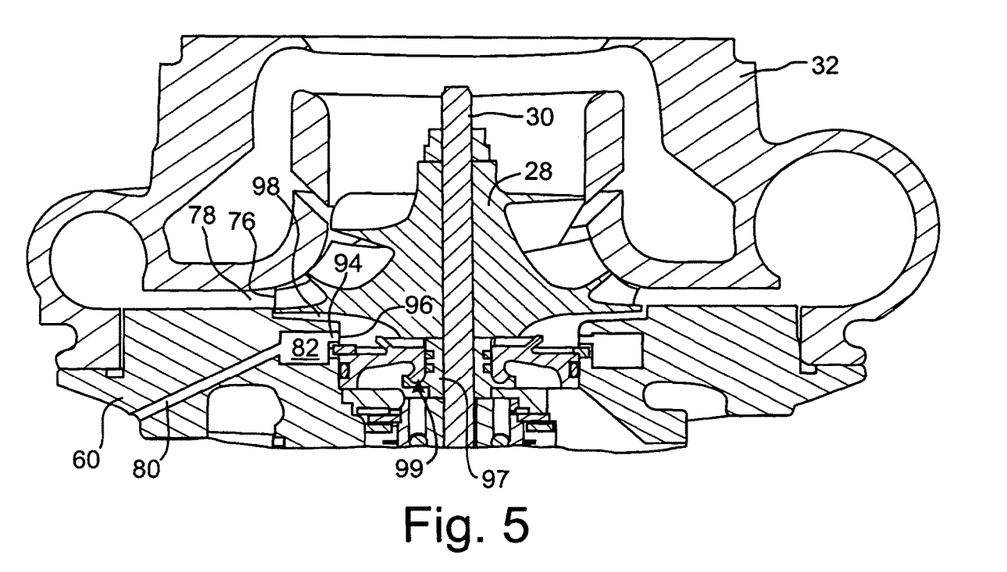
FIG. 5 is a sectioned view of a product according to a number of variations.

In a number of variations as illustrated in FIG. 5, the EGR inlet channel 80 may extend through the bearing housing 60 to the EGR distribution cavity 82. The EGR distribution cavity 82 may be directed radially inward and may connect with an EGR passage 94 that includes an opening 96 to the pocket 98 on the back side 92 of the compressor wheel 28. The pocket 98 may be defined as the area bounded on its axial sides by the compressor wheel 28 and the bearing housing 60, and on its radial sides by the compressor wheel tip 76 and the shaft 30, or a ring 97 that may rotate with the shaft 30. The EGR passage 94 may extend radially inward from the EGR distribution cavity 82 and may be disposed toward the compressor side bearing housing seal assembly 99. Introducing the EGR gas at this point may raise the pressure in the compressor wheel pocket 98 helping to equalize the pressure across the seal assembly 99. This may help maintain lubricant within the bearing housing 60. After flowing into the pocket 98 the EGR gas flow is then entrained with the air at the exit of the compressor wheel 28 through the fresh air port 78.

Figure 6:
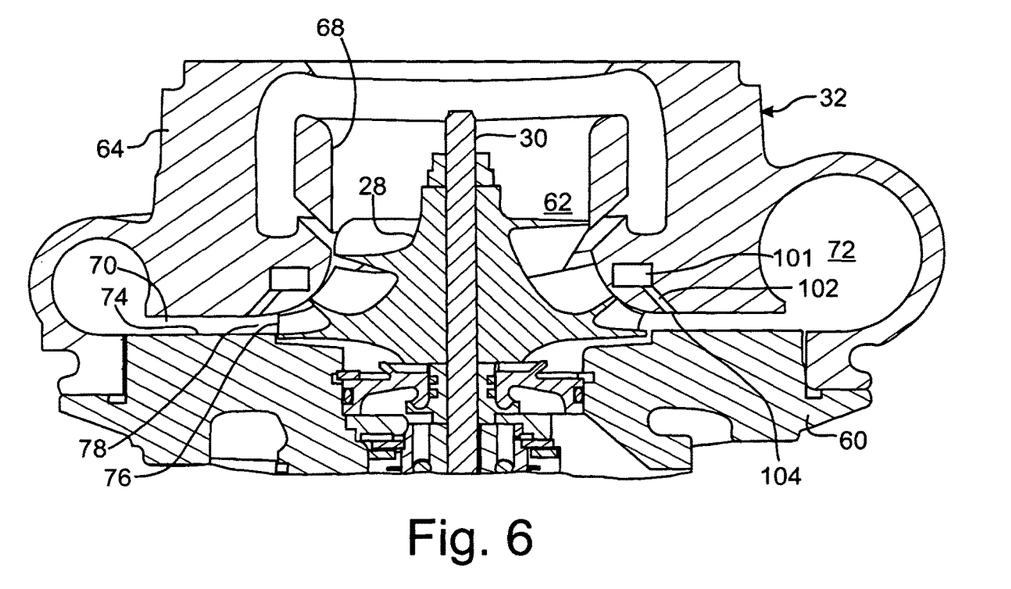
FIG. 6 is a sectioned view of a product according to a number of variations.

In a number of variations as illustrated in FIG. 6, an EGR distribution cavity 101 may be formed in the compressor cover 64. The EGR distribution cavity 101 may be formed completely within the compressor cover 64 and may have a rectangular cross section that has a consistent open cross sectional area all around the shaft 30 forming an annular shape. The EGR distribution cavity 101 may be disposed entirely radially inward relative to the volute 72. An EGR passage 102 may connect the EGR distribution cavity 101 with the fresh air port 78 and may open to the diffuser 70 at an opening 104 into the fresh air port 78. An EGR inlet channel (not shown), may extend into the compressor cover 64 to the EGR distribution cavity 101 for supplying EGR gas thereto.

Through the variations described herein, the exhaust manifold 16 pressure may be reduced while maintaining constant intake manifold 44 pressure and may generate a more beneficial pressure differential across the cylinder heads of the engine 14. As a result, less work may be needed from the engine 14 to move the air, or more work can be done by the engine 14 during the gas exchange process. The pumping work in terms of mean effective pressure (MEP Pumping) as compared to the engine brake mean effective pressure (BMEP) provides an efficiency advantage.

The following description of variants is only illustrative of components, elements, acts, products and methods considered to be within the scope of the invention and is not in any way intended to limit such scope by what is specifically disclosed or not expressly set forth. Components, elements, acts, products and methods may be combined and rearranged other than as expressly described herein and still are considered to be within the scope of the invention.

Variation 1 may involve a product and may include a bearing housing in which a shaft may be supported by a bearing so that it may rotate. A compressor wheel may be disposed on the shaft. A compressor cover may be connected with the bearing housing and may create a compressor body that may define a chamber within which the compressor wheel may rotate. A diffuser may extend radially outward from the chamber and may receive gas from the compressor wheel. An inlet may be provided to the compressor body which may receive a supply of exhaust gas. An EGR distribution cavity may be defined within the compressor body and may extend around the shaft. An EGR inlet channel may extend into the bearing housing from the inlet to the EGR distribution cavity. An EGR passage may extend from the EGR distribution cavity to the diffuser.

Variation 2 may include the product according to variation 1 wherein the shaft may rotate on an axis and the EGR inlet channel may extend in a direction toward the axis.

Variation 3 may include the product according to variation 1 wherein the EGR distribution cavity may extend in a circle around the shaft and at any point along the circle may have a consistent cross section.

Variation 4 may include the product according to variation 1 wherein the compressor wheel may include a compressor wheel tip at its radially outermost perimeter. The bearing housing may include a diffuser face that may define a side of the diffuser that extends in a radial direction toward the shaft and may be directed at the compressor wheel tip.

Variation 5 may include the product according to variation 1 wherein the compressor wheel and bearing housing may define a pocket between them that may extend in a radial direction inward from a radially outermost tip of the compressor wheel. The EGR passage may open directly into the pocket.

Variation 6 may include the product according to variation 1 wherein the shaft may rotate on an axis and the EGR inlet channel may extend to be directed toward the axis, which may be at an oblique angle.

Variation 7 may include the product according to variation 1 and may include an engine, an exhaust passage carrying exhaust away from the engine, and an EGR passage connecting the exhaust passage with the EGR inlet channel.

Variation 8 may include a method of operating the product of variation 7 and may include providing an exhaust throttle valve in the exhaust passage. Exhaust gas may be delivered to the EGR inlet channel without throttling the exhaust throttle valve.

Variation 9 may include the method according to variation 8 and may include providing a pocket between the compressor wheel and the bearing housing that may extend in a radial direction inward from a radially outermost tip of the compressor wheel. At least of part of the EGR passage may be directed to supply exhaust gas directly into the pocket.

Variation 10 may involve a product that may include a bearing housing in which a shaft may be supported by a bearing to rotate. A compressor wheel may be disposed on the shaft. A compressor cover may be connected with the bearing housing and may form a compressor body that may define a chamber within which the compressor wheel may rotate and defining an air inlet through which air may be directed into the chamber. A diffuser may extend radially outward from the chamber and may receive gas from the compressor wheel. An EGR inlet in the compressor body may receive a supply of exhaust gas. An EGR distribution cavity may be defined in the compressor body and may extend around the shaft. An EGR inlet channel may extend into the compressor body from the EGR inlet to the EGR distribution cavity. An EGR passage may extend from the EGR distribution cavity to the diffuser.

Variation 11 may include the product according to variation 10 wherein the EGR distribution cavity may extend in a circle around the shaft and at any point along the circle may have a consistent cross section.

Variation 12 may include the product according to variation 10 wherein the compressor wheel may include a compressor wheel tip at its radially outermost perimeter. The bearing housing may include a diffuser face defining a side of the diffuser that extends in a radial direction toward the shaft and may be directed at the compressor wheel tip.

Variation 13 may include the product according to variation 10 wherein the compressor wheel and bearing housing may define a pocket between them that may extend in a radial direction inward from a radially outermost tip of the compressor wheel. The EGR passage may open directly into the pocket.

Variation 14 may include the product according to variation 10 wherein the shaft may rotate on an axis and the EGR inlet channel may point toward the axis.

Variation 15 may include the product according to variation 10 wherein the EGR distribution cavity may be annular in shape and may have a rectangular cross section.

The above description of select variations within the scope of the invention is merely illustrative in nature and, thus, variations or variants thereof are not to be regarded as a departure from the spirit and scope of the invention.

What is claimed is:

1. A turbocharger comprising a bearing housing in which a shaft is supported by a bearing to rotate, a compressor wheel disposed on the shaft, a compressor cover connected with the bearing housing creating a compressor body defining a chamber within which the compressor wheel rotates, a diffuser extending radially outward from the chamber and for receiving gas comprising at least one of air or exhaust gas from the compressor wheel during operation of the turbocharger, an inlet on the compressor body receiving a supply of exhaust gas, an EGR distribution cavity defined completely within the compressor body and extending around the shaft, an EGR inlet channel extending into the bearing housing from the inlet to the EGR distribution cavity, and an EGR passage extending from the EGR distribution cavity to the diffuser, wherein the compressor wheel and bearing housing define a pocket between them that extends in a radial direction inward from a radially outermost tip of the compressor wheel, the EGR passage opening directly into the pocket.

2. The turbocharger according to claim 1 wherein the shaft rotates on an axis and the EGR inlet channel extends in a direction toward the axis.

3. The turbocharger according to claim 1 wherein the EGR distribution cavity extends in a circle around the shaft and at any point along the circle has a consistent cross section.

4. The turbocharger according to claim 1 wherein the compressor wheel includes a compressor wheel tip at a radially outermost perimeter, and wherein the bearing housing includes a diffuser face defining a side of the diffuser that extends in a radial direction toward the shaft and is directed at the compressor wheel tip.

5. The turbocharger according to claim 1 wherein the shaft rotates on an axis and the EGR inlet channel extends to be directed toward the axis at an oblique angle.

6. The turbocharger according to claim 1 comprising an engine, an exhaust passage carrying exhaust away from the engine, and an EGR passage connecting the exhaust passage with the EGR inlet channel.

7. A method of operating a turbocharger comprising a bearing housing in which a shaft is supported by a bearing to rotate, a compressor wheel disposed on the shaft, a compressor cover connected with the bearing housing creating a compressor body defining a chamber within which the compressor wheel rotates, a diffuser extending radially outward from the chamber and receiving gas comprising at least one of aft or exhaust gas from the compressor wheel, an inlet on the compressor body receiving a supply of exhaust gas, an EGR distribution cavity defined completely within the compressor body and extending around the shaft, an EGR inlet channel extending into the bearing housing from the inlet to the EGR distribution cavity, and an EGR passage extending from the EGR distribution cavity to the diffuser, comprising an engine, an exhaust passage carrying exhaust away from the engine, and an EGR passage connecting the exhaust passage with the EGR inlet channel, and delivering exhaust gas to the EGR inlet channel without adjusting, an exhaust throttle valve, and providing a pocket between the compressor wheel and the bearing housing that extends in a radial direction inward from a radially outermost tip of the compressor wheel, and directing at least of part of the EGR passage to supply exhaust gas directly into the pocket.

8. A turbocharger comprising a bearing housing in which a shaft is supported by a bearing to rotate, a compressor wheel disposed on the shaft, a compressor cover connected with the bearing housing forming a compressor body that defines a chamber within which the compressor wheel rotates and defines an air inlet through which air is directed into the chamber, a diffuser extending radially outward from the chamber and for receiving gas comprising at least one of air or exhaust gas from the compressor wheel during operation, an EGR inlet in the compressor body receiving a supply of exhaust gas, an EGR distribution cavity defined in the compressor body and extending around the shaft, an EGR inlet channel extending into the compressor body from the EGR inlet to the EGR distribution cavity, and an EGR passage extending from the EGR distribution cavity to the diffuser, and wherein the compressor wheel and bearing housing define a pocket between them that extends in a radial direction inward from a radially outermost tip of the compressor wheel, the EGR passage opening directly into the pocket.

9. The turbocharger according to claim 8 wherein the ERR distribution cavity extends in a circle around the shaft and at any point along the circle has a consistent cross section.

10. The turbocharger according to claim 8 wherein the compressor wheel includes a compressor wheel tip at a radially outermost perimeter, and wherein the bearing housing includes a diffuser face defining a side of the diffuser that extends in a radial direction toward the shaft and is directed at the compressor wheel tip.

11. The turbocharger according to claim 8 wherein the shaft rotates on an axis and the EGR inlet channel points toward the axis.

12. The turbocharger according to claim 8 wherein the EGR distribution cavity is annular in shape and has a rectangular cross section.

13. A turbocharger for use with an engine, wherein the engine includes an exhaust passage operatively arranged to carry exhaust gas away from the engine and an intake passage operatively arranged to provide air to the engine, the compressor comprising: a bearing housing in which a shaft is supported by a bearing to rotate about an axis; a compressor wheel disposed on the shaft; a compressor cover connected to the bearing housing and defining a chamber within which the compressor wheel rotates about the axis, the compressor cover comprising: a first inlet arranged to deliver aft to the compressor wheel; and a diffuser extending radially outward from the chamber and receiving at least a portion of the air from the compressor wheel; and an EGR junction, comprising: a second inlet arranged to receive at least a portion of the exhaust gas from the engine; an EGR distribution cavity extending around the shaft; an EGR inlet channel extending from the second inlet to the EGR distribution cavity; and an EGR passage extending from the EGR distribution cavity to the diffuser and arranged to deliver at least a portion of the exhaust gas to the diffuser, and wherein the EGR passage includes an opening to a back side of the compressor wheel.

14. The turbocharger of claim 13, wherein the EGR junction is disposed in the compressor cover.

15. The turbocharger of claim 13, wherein the EGR junction is disposed in the bearing housing.

16. The turbocharger of claim 13, further comprising a backplate disposed between the compressor cover and the bearing housing, wherein the bookplate forms a portion of the diffuser, and wherein the EGR junction is disposed in the bookplate.

17. The turbocharger of claim 13 wherein the bearing housing includes a separate backplate disposed adjacent the compressor cover and wherein the backplate forms part of the diffuser.

18. A turbocharger for use with an engine, wherein the engine includes an exhaust passage operatively arranged to carry exhaust gas away from the engine and an intake passage operatively arranged to provide air to the engine, the compressor comprising:
  a bearing housing in which a shaft is supported by a bearing to rotate about an axis;
  a compressor wheel disposed on the shaft, and wherein the compressor wheel includes a wheel tip;
  a compressor cover connected to the bearing housing and defining a chamber within which the compressor wheel rotates about the axis, the compressor cover comprising:
    a first inlet arranged to deliver air to the compressor wheel; and a diffuser extending radially outward from the chamber and receiving at least a portion of the air from the compressor wheel; and
  an EGR junction including:
    a second inlet arranged to receive at least a portion of the exhaust gas from the engine;
    an EGR distribution cavity extending around the shaft;
    an EGR inlet channel extending from the second inlet to the EGR distribution cavity; and
    an EGR passage extending from the EGR distribution cavity to the diffuser and arranged to deliver at least a portion of the exhaust gas to the diffuser;
    wherein the EGR inlet channel is formed at an oblique angle relative to the axis;
    wherein the EGR passage connects the EGR distribution cavity with a fresh air port extending from the first inlet;
    wherein the EGR passage opens through a face of the diffuser face at an position spaced from the compressor wheel tip so that an annular ramp being defined by the bearing housing around the compressor wheel tip; and
    wherein the EGR passage is angled radially outward so that EGR gas flowing there through is directed radially outward similar to the air flowing through the fresh air port.

* * * * *

UNITED STATES PATENT AND TRADEMARK OFFICE
CERTIFICATE OF CORRECTION

PATENT NO. : 10,947,931 B2
APPLICATION NO. : 16/158583
DATED : March 16, 2021
INVENTOR(S) : McHenry et al.

It is certified that error appears in the above-identified patent and that said Letters Patent is hereby corrected as shown below:

In the Specification

In Column 3, Line 2, should read:
pressure requirement could result in lower

In Column 4, Line 6, should read:
cavity 82. The EGR inlet channel 80 may extend toward In the Claims In Column 7, Line 67, should read:
least one of air or exhaust gas from the compressor wheel, In Column 8, Line 62, should read:
deliver air to the compressor wheel; and a diffuser extending Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*